Patented Nov. 25, 1924.

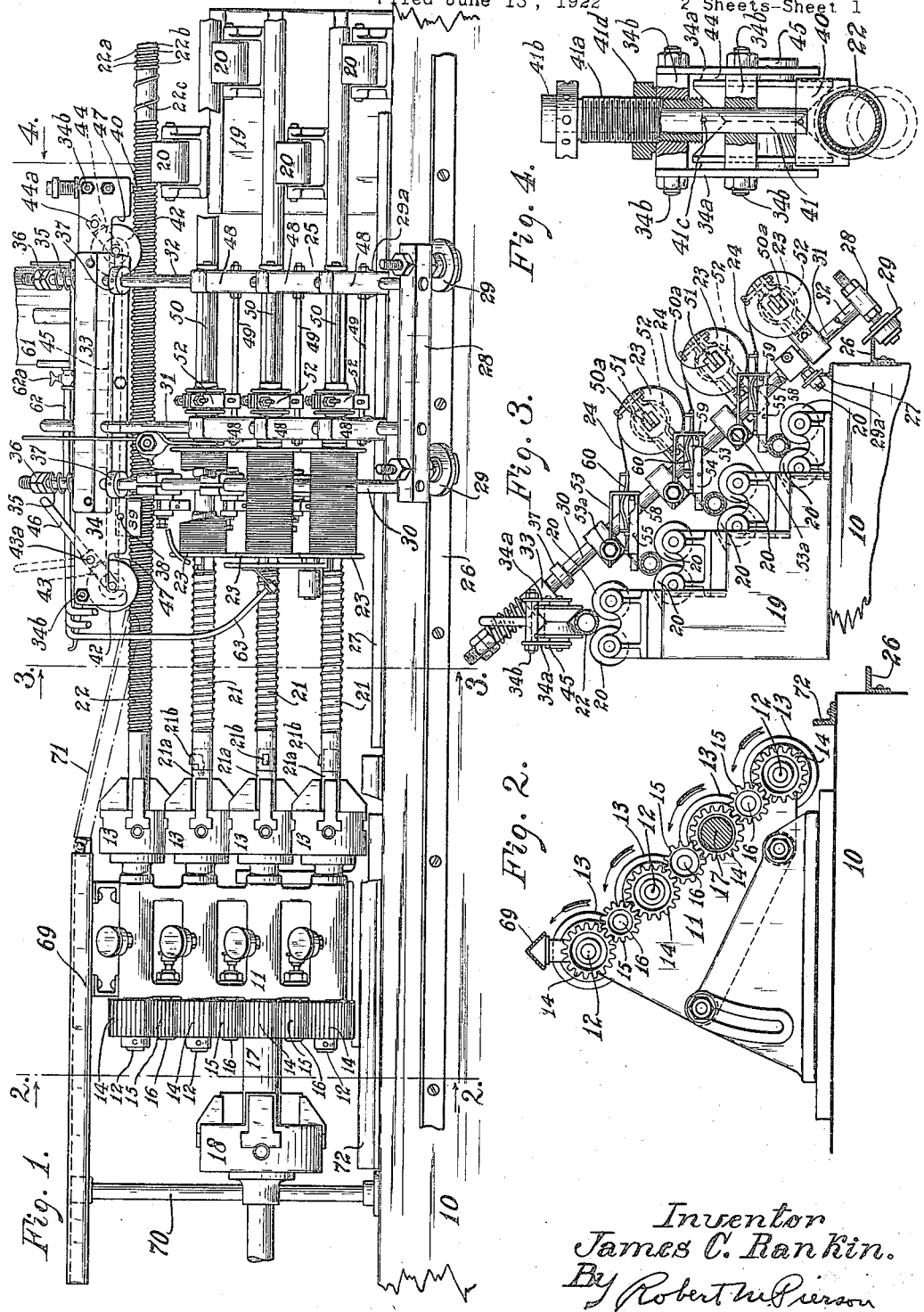

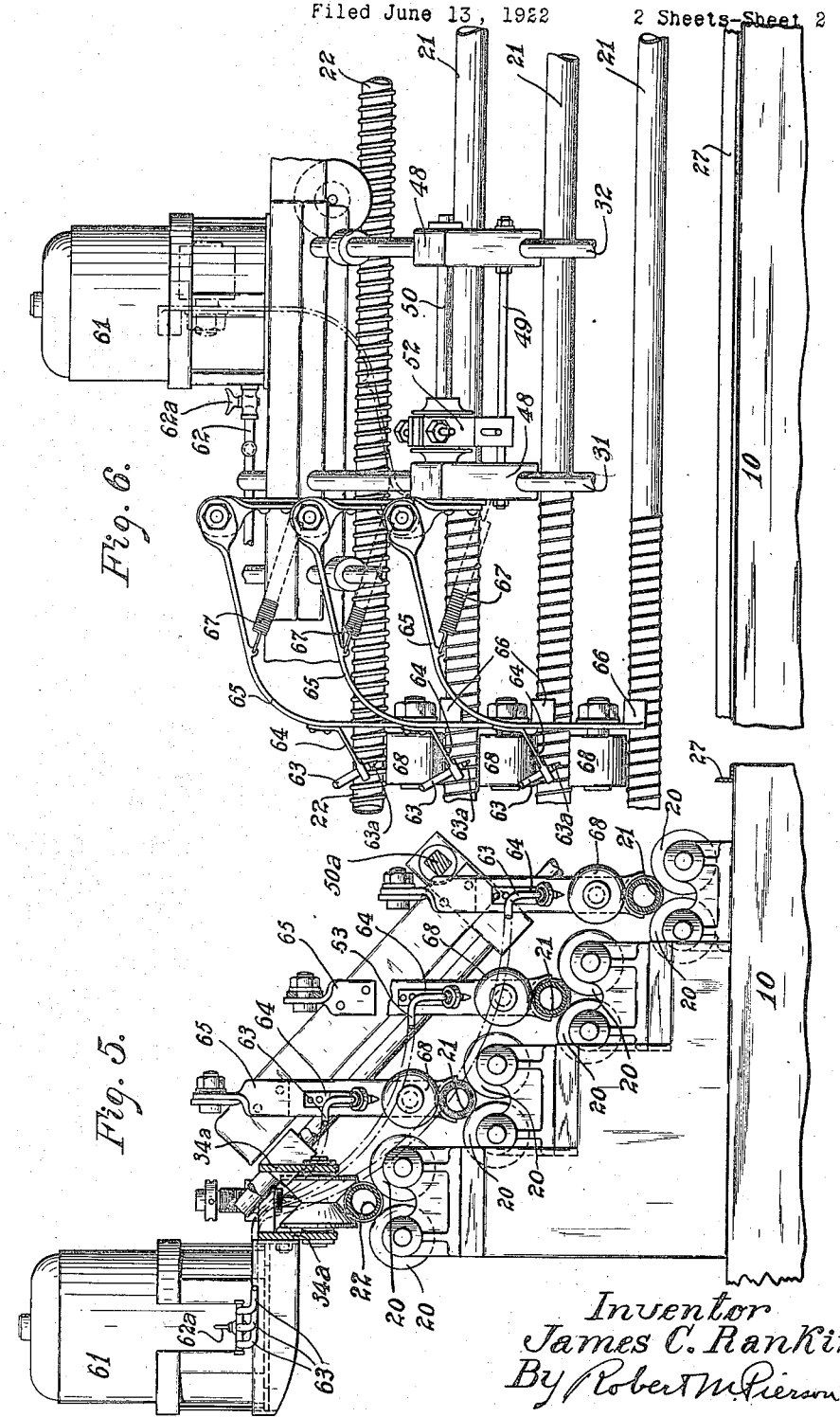

1,516,620

UNITED STATES PATENT OFFICE.

JAMES C. RANKIN, OF AKRON, OHIO, ASSIGNOR TO THE B. F. GOODRICH COMPANY, OF NEW YORK, N. Y., A CORPORATION OF NEW YORK.

HOSE-MAKING APPARATUS.

Application filed June 13, 1922. Serial No. 568,053.

*To all whom it may concern:*

Be it known that I, JAMES C. RANKIN, a citizen of the United States, residing at Akron, in the county of Summit and State of Ohio, have invented a certain new and useful Hose-Making Apparatus, of which the following is a specification.

This invention relates to the art of manufacturing hose and particularly hose having a helical reinforcement such as a winding of wire within its wall or upon its surface.

My objects are to obtain an accurate winding of the reinforcement, to provide an improved labor-saving apparatus adapted simultaneously to apply the helical winding, with or without a coat of cement, to a plurality of lengths of hose material, and in the case of a wire winding, more particularly, to vary the pitch of the winding at certain points in order to facilitate the cutting of a long length of hose into sections; and to provide a device readily adaptable for windings of different pitch.

Of the accompanying drawings:

Fig. 1 is a side elevation of an apparatus embodying my invention, with parts broken away.

Fig. 2 is a section on line 2—2 of Fig. 1.

Fig. 3 is a section on line 3—3 of Fig. 1, with the cementing attachments removed.

Fig. 4 is a section on line 4 of Fig. 1, parts being broken away.

Fig. 5 is a section on line 3—3 of Fig. 1, on a larger scale, with the cementing attachments in operative position, parts being broken away.

Fig. 6 is a side elevation of a part of the apparatus, on a large scale, showing the cementing attachments.

Referring to the drawings, 10 is a long bench upon one end of which is mounted a multiple-bearing bracket or standard 11 (Figs. 1 and 2) formed with a plurality (here shown as 4) horizontal bearings running lengthwise of the bench 10 and aligned in a series sloping upward and backward from the front of the bench. In each bearing is journaled the spindle 12 of a mandrel-driving chuck 13. Upon the rear end of each of said spindles is secured a gear 14, 14, said gears being meshed in a chain with alternate gears 15, 15 journaled on studs 16, 16, projecting from the standard 11. One of the spindles 12 of the chucks 13 is provided with an enlarged extension 17 beyond its gear 14, said extension being adapted to be turned by suitable means, such as the chuck 18 here shown (Fig. 1) to rotate the several chucks 13, the specific device here shown being adapted to rotate them in the same direction and at the same speed, counter-clockwise, as viewed in Fig. 2.

At one or more places along the bench 10 I mount a standard or standards such as is shown at 19, upon which are loosely journaled pairs of mandrel-supporting rollers 20, 20, each pair of said rollers being adapted rotatably to support a hose mandrel, 21, 21, or a master-mandrel or feed-screw 22, mounted in the respective chucks 13, the feed-screw being here shown as mounted in the uppermost chuck 13. Each of the mandrels preferably comprises an end section 21$^a$ adapted to be gripped in the chuck and so formed on its projecting end as freely to receive the hollow end of the mandrel proper and drive the latter, means such as the spring latch 21$^b$ being provided to hold them together, although permitting their separation by a simple pull on the mandrel proper, and to compel them to rotate together.

The feed screw 22 may consist of an ordinary hose mandrel having a round wire 22$^a$ wound helically thereon, in alternate convolutions with a flat wire 22$^b$ serving as spacing means for said round wire, and at intervals said flat wire may be omitted for a space and the round wire soldered to the mandrel in relatively steep convolutions, as indicated at 22$^c$ (Fig. 1), to provide for a wider spacing of the wire winding on the work at corresponding positions, as will be hereinafter explained.

For carrying wire-spools, 23, 23 from which wires 24, 24 may be drawn onto the mandrels 21 by the rotation of the latter, I provide a laterally inclined carriage 25 adapted to run upon the feed screw 22 and upon a pair of rails 26, 27, the rail 26 consisting of a piece of angle-iron one flange of which projects horizontally from the front face of the bench 10, and the rail 27 being mounted on the front margin of said bench. Said carriage comprises a lower beam-member 28 on which are journaled flanged wheels 29, 29 adapted to run in contact with the outer edge of the rail 26, their flanges preventing their downward movement and their cylindrical faces preventing their directly upward movement with respect to said rail. Secured in said beam member and inclined upward and backward over the mandrels and feed-screw are three parallel, aligned rods, 30, 31, 32, extending slidably through an upper beam member 33 secured to the side of a truck 34 adapted to run on the feed-screw 22. $29^a$, $29^a$ are wheels mounted upon the carriage 25 and adapted to run on the rail 27. The rods 30 and 32 are provided with helical compression springs 35, 35 on their upper ends adapted to bear against retaining nuts 36, 36 on the ends of said rods and against the beam-member 33 to urge said rods yieldingly upward with respect to the latter, so as to compensate for inequalities in the spacing of the feed-screw 22 from the rails 26, 27. The rods 30 and 32 are provided with collars 37, 37 secured thereon below the beam 33 to limit their upward movement with respect to the latter when the lower side of the carriage 25 is swung from the rails 26, 27 on occasion, as hereinafter described.

The truck 34 comprises a pair of side plates $34^a$, $34^a$, suitably connected by shouldered strut-members $34^b$, $34^b$, between which plates is pivoted at 38 a shoe 39 fitting over the feed-screw 22 and adapted to ride upon the latter partially to support said truck during the latter's operative movement. For supporting the other end of said truck and driving the carriage 25 I provide a vertical, transverse plate 40, the lower edge of which fits over the feed-screw 22 between adjacent threads thereof, said plate being secured the lower end of a vertical bolt 41 (Fig. 4) projecting downward from the truck 34. Said bolt is rotatably mounted in a sleeve $41^a$, the latter being threaded through one of the strut-members $34^b$, so as to be vertically adjustable, to compensate for wear of the plate 40. The bolt 41 is provided with a head $41^b$ and a cotter pin $41^c$ adapted to prevent longitudinal movement of said bolt in said sleeve. $41^d$ is a lock-nut on said sleeve.

For clearing the shoe 39 and the driving plate 40 from the feed-screw 22, to permit the free return of the carriage 25 to starting position, a pair of V-rollers 42, 42 are journaled between the arms of respective forks 43, 44 pivoted at $43^a$ and $44^a$ between the plates $34^a$, the journals of said V-rollers being connected by a link 45 and one of said forks being extended above its pivot in a hand-lever 46 by which said forks may be simultaneously turned about their pivots to raise the truck 34 onto said rollers. The plates $34^a$ are cut away to form notches 47, 47 and the journals of the rollers 42 are extended through said notches, the notches being so formed and positioned as to stop the pivotal movement of the forks 43, 44 when the latter are in a past-center position, so that the truck will continue to be supported by the V-rollers 42 when the lever 46 is thrown to the left, as viewed in Fig. 1, and released.

The spool supporting means comprises a set of journal brackets 48, 48 secured in aligned pairs upon the rods 31 and 32 of the carriage 25, the brackets of each pair being connected by a brace rod 49. A spool-supporting arbor 50 is journaled in each pair of said brackets, each arbor having a square end portion $50^a$ (Fig. 3) projecting beyond the rod 31 and adapted to receive and prevent relative rotation of one of the spools 23. 51 is a spring-backed, cam-latch on said arbor adapted to hold the spool thereon. Each of the arbors is provided with a tension brake 52.

For further tensioning each of the wires 24 and guiding it onto the respective mandrel 21, a bracket 53 is secured on the rod 30 by a clamp $53^a$ and a wire tensioning and guiding device including a wire laying finger 54 (Fig. 3) is pivoted at 55 on said bracket, said wire-laying finger having a slotted, wire guiding end adapted to bear yieldingly against the work under pressure of a compression spring (not shown) interposed between said finger and the bracket 53 on which it is pivoted. A rearward extension 58 from said finger is adapted to abut a pin 59 on said bracket to limit the pivotal movement of said finger when the carriage 25 is lifted from the work. Secured upon the bracket 53 is a wire-guiding and tensioning tube 60, said tube being curved at its middle portion and thus adapted to tension the wire as the latter is drawn therethrough and also to iron out bends in the wire, which sometimes comes from the spool with such bends in it as would result in an unequal spacing of the wire convolutions upon the work if its set were not so modified by passing it through the bent tube.

In the making of certain types of hose, a coating of rubber cement is applied thereto after the wire winding, and for this purpose I provide a cementing device comprising a supply tank 61 mounted upon the truck 34 and having an outlet pipe 62 with a shut-off valve $62^a$ therein, from which outlet pipe flexible tubes 63 extend to positions directly over the respective mandrels 21, where each is supported by a bracket 64 projecting from an arm 65 pivotally mounted on the carriage 25. Each of said arms is so curved as to pass over the adjacent wire spool 23, and is formed with a foot 66 adapted to ride upon the work as the carriage moves along the latter. 67, 67 are over-center pull springs adapted to hold said arms down against the work but to permit them to be turned upward about their pivots, as shown in dot-and-dash lines in Fig. 6, to clear them from the work for the free running of the carriage between operations. 68, 68 are cement-distributing rollers journaled respectively on said arms directly under the delivery ends of the flexible tubes 63 and adapted to receive cement as it runs from the nozzles 63ª of said tubes and smear it upon the work, said rollers being adapted to contact and be rotated by the work.

For receiving the carriage 25 and supporting it out of the way during the insertion and removal of the work, I provide a rail 69 (Figs. 1 and 2) mounted on a post 70 rising from the bench 10 and upon the standard 11, said rail being parallel with but higher than the feed-screw 22, and adapted to be run upon by the wheels 42 of the truck 34, and I provide a detachable bridge rail 71 adapted to be connected at one end with the rail 69 and at the other end to rest upon the feed-screw 22, so that said truck may run thereon from the feed-screw to the rail 69. I also provide a rail 72 on the front margin of the bench 10, in position to receive the wheels 29 of the carriage when the latter is run onto said rail 69.

In the operation of the apparatus, the carriage 25 being supported by the rails 69 and 72, a feed-screw, 22, suitable for the type of winding desired, is mounted upon the uppermost set of supporting rollers 20 and secured in the uppermost chuck 13, and the hose mandrels 21, with the partly constructed hose thereon, are mounted respectively upon the other sets of supporting rollers 20 and secured in the other chucks 13. In case the mandrels are of the type last used, the mandrel sections 21ª gripped by the chucks may have been left therein from the last operation, and the mandrel sections carrying the work may be simply slid onto the end portions of said sections, being automatically latched thereon by the latches 21ᵈ.

The carriage 25 is then run from the rail 69, down the rail 71, onto the feed-screw 22, its lower side being lifted and carried by the operator and deposited with its wheels 29, 29ª on the rails 26, 27.

The bridge rail 71 is then removed, the carriage run back to the end of the work adjacent the chucks 13, the lever 46 turned to lower the truck 34 until the shoe 39 and the fed-plate 40 rest upon the feed-screw 22, and the wires 24 are started upon the respective mandrels by hand and secured in any suitable manner. The arms 65 are then turned about their pivots until their shoes 66 and cement distributing rollers 68 rest upon the mandrels, the valve 62ª is opened to permit cement to flow through the tubes 63, and power is applied through the chuck 18 to rotate the feed screw 22 and mandrels 21. While the apparatus here shown is adapted to rotate them at the same speed and in the same direction, counter-clockwise, as viewed in Figs. 2 and 3, I do not wholly limit my claims to so rotating them.

The carriage 25 is thereby driven along the mandrels, by the feed-screw 22 acting upon the plate 40, and the wires 24 are drawn onto the respective mandrels 21 in helical convolution corresponding to the thread or wire 22ª of said feed-screw. When said plate 40 reaches the steeply pitched threads or convolutions of the wire 22ª at 22ᶜ (Fig. 1), the carriage 25 is moved more rapidly forward for a space. so that the corresponding convolutions of wire on the work will be steeply pitched to facilitate the subsequent cutting of the work into lengths.

When the carriage 25 has reached the far end of the mandrels the power is stopped, for which purpose extension controls (not shown) may be provided, the cement valve 62ª is closed, each wire is severed at the delivery end of its guide-tube 60 and bent to prevent its recession into said tube, and the other end of wire is secured to the work in any suitable manner.

The arms 65 are then turned over to the positions indicated, as to one of them, by dot-and-dash lines in Fig. 6, the lever 46 is moved to the left, as viewed in Fig. 1, to cause the wheels 42 to support the truck 34, and the operator, lifting the lower side of the carriage 25, which turns about the feed screw 22 as a pivot, runs it back to the first end of the mandrels, the shoe 39 and driving plate 40 being clear of the feed-screw. He then places in position the bridge rail 71 and runs the carriage thereover onto the rails 69 and 72. The mandrels 21 with the work thereon are removed, a new set inserted, and the operation as described is repeated.

Modifications may be resorted to without departing from the scope of my invention, and I do not wholly limit my claims to the specific embodiment here shown and described.

I claim:

1. Hose making apparatus comprising a hose mandrel, a feed-screw, means for supporting said feed-screw, and said mandrel in parallel relation and rotating them, a carriage adapted to be driven along said mandrel by said feed-screw, a wire supply spool adapted to give off wire to said mandrel and means mounted on said carriage for guiding wire from said spool onto the work, said wire guiding means including a bent tube through which the wire passes from said spool to the work.

2. Hose making apparatus comprising a hose mandrel, a feed-screw, means for supporting said feed-screw and said mandrel in parallel relation and rotating them, a carriage adapted to be driven along said mandrel by said feed-screw, a wire-supply spool adapted to give off wire to said mandrel, means mounted on said carriage for guiding wire from said spool onto the work, and means driven by said feed-screw for applying cement to the work.

3. Hose making apparatus comprising a hose mandrel, a feed-screw, means for supporting said feed-screw and said mandrel in parallel relation and rotating them, a carriage adapted to be driven along said mandrel by said feed-screw, a wire-supply spool adapted to give off wire to said mandrel, means mounted on said carriage for guiding wire from said spool onto the work, and means driven by said feed-screw for applying cement to the work, said cement-applying means comprising a cement-distributing member adapted progressively to contact the work and means for supplying cement to said member.

4. Hose making apparatus comprising a feed-screw, means for supporting and rotating the same, a pair of rollers adapted freely to receive a hose mandrel laid thereon and to rotatably support the same, a chuck adapted to grip one end of said mandrel, said chuck and said pair of rollers being so positioned as to support said mandrel in parallel relation and adjacent to said feed-screw, a wire-supplying carriage adapted to be driven along said mandrel by said feed-screw, and means for driving said chuck and said feed-screw at determinate relative speeds.

5. Hose making apparatus comprising a feed-screw, a hose mandrel, means for supporting said feed-screw and said mandrel in parallel relation and rotating them, a wire-supplying carriage adapted to be driven by said feed-screw along said mandrel, a wheel on said carriage adapted to run upon said feed-screw to support said carriage, and a detachable bridge rail adapted to rest upon said feed-screw and to receive said wheel for the removal of said carriage from said feed-screw.

6. Hose making apparatus comprising a feed-screw having a thread of varying pitch, a hose mandrel, means for supporting said mandrel and said feed-screw in parallel relation and rotating them at constant relative speeds, and wire-supplying carriage adapted to be driven along said mandrel by said feed-screw.

7. Hose making apparatus comprising a rotary member adapted axially to receive in supporting engagement one end of a hose mandrel, a hose mandrel adapted to be associated with said rotary member by an axial thrust of said mandrel, a latch adapted to resist axial and angular movement of said mandrel with relation to said member, means for rotatably supporting the other end portion of said mandrel, means for driving said rotary member to rotate said mandrel, and means for feeding a strand of material onto said mandrel as it is rotated.

8. Hose making apparatus comprising a feed-screw, a set of hose mandrels, means for supporting said feed-screw and said hose mandrels horizontally in substantially parallel relation, means for rotating said feed-screw and hose mandrels, a rail mounted substantially parallel with said feed-screw and mandrels, a carriage adapted to run on said rail and said feed-screw and to be driven by the latter, yielding means interposed operatively between parts of said carriage and adapted to compensate for variations in the distance between said feed-screw and said rail, and wire-supplying means on said carriage from which wire may be drawn onto said mandrels by their rotation.

9. Hose making apparatus comprising a feed-screw, a plurality of hose mandrels, means for rotatably supporting said feed-screw and said mandrels in parallel relation, means for driving said feed-screw and said mandrels at determinate relative speeds, a carriage adapted to be driven along said mandrels by said feed-screw, a wire-supply spool for each of said mandrels, mounted on said carriage, and means for guiding wire from each of said spools onto the corresponding mandrel as it is drawn thereon by the rotation of said mandrel.

10. Hose making apparatus comprising a feed-screw a plurality of hose mandrels, an inclined series of chucks adapted respectively to support one end of the feed-screw or a mandrel and drive the same, the axes of rotation of said chucks being parallel and substantially horizontal, means for driving said chucks at determinate relative speeds, means for rotatably supporting the opposite ends of said feed-screw and mandrels, said supporting means for the mandrels being adapted freely to receive the latter from above, a rail mounted parallel with the axes of said chucks, along said mandrels, a carriage mounted on said rail and adapted to be driven by said feed-screw along said mandrels, and wire-supplying and wire-guiding means mounted on said carriage, for each of said mandrels, said rail and said feed-screw constituting supporting means for said carriage, and said carriage being adapted, on occasion, to be run, free of the work, upon its said supporting means.

In witness whereof I have hereunto set my hand this 6 day of June, 1922.

JAMES C. RANKIN.